United States Patent [19]

Higgins

[11] Patent Number: 5,277,822
[45] Date of Patent: Jan. 11, 1994

[54] EXTRACTION OF THERMALLY STABLE CONTAMINANTS FROM STACK GAS SCRUBBING AMINES

[75] Inventor: Irwin R. Higgins, Oak Ridge, Tenn.

[73] Assignee: Tetra Technologies, Inc., Oak Ridge, Tenn.

[21] Appl. No.: 887,041

[22] Filed: May 22, 1992

[51] Int. Cl.[5] .............................................. C02F 1/42
[52] U.S. Cl. .................................. 210/673; 210/675; 210/676
[58] Field of Search .................... 423/228, 229, 242.7, 423/DIG. 14; 210/661, 670, 673, 675, 676, 678, 268

[56] References Cited

U.S. PATENT DOCUMENTS

| | | | |
|---|---|---|---|
| 2,687,999 | 8/1954 | Bott et al. | 210/673 |
| 2,797,188 | 6/1957 | Taylor, Jr. et al. | 423/228 |
| 2,815,322 | 12/1957 | Higgins | 210/268 |
| 3,549,526 | 12/1970 | Brown | 210/675 |
| 3,565,798 | 2/1971 | Barnes | 210/268 |
| 3,580,842 | 5/1971 | Higgins | 210/675 |
| 3,896,214 | 7/1975 | Newman | 423/166 |
| 4,477,419 | 10/1984 | Pearce et al. | 423/228 |
| 4,795,565 | 1/1989 | Yan | 210/669 |
| 4,970,344 | 11/1990 | Keller | 210/669 |

*Primary Examiner*—Stanley Silverman
*Assistant Examiner*—Cynthia L. Nessler
*Attorney, Agent, or Firm*—Pitts & Brittian

[57] ABSTRACT

A process for the removal of thermally-stable contaminants from stack gas scrubbing amines using a continuous countercurrent ion exchange column. Amines contaminated after use in stack gas scrubbing are fed into the column containing an anion exchanger resin where the contaminants are sorbed on the resin. The amine is washed from the resin with hot water and is removed from the column. The resin is then pulsed to move the resin with the sorbed contaminants into a elution section of the column. The contaminants are removed using an eluant of sodium hydroxide solution, preferably containing chlorine to enhance elution of thiocyanate ion. A water wash removes traces of the hydroxide solution and any reaction products, and then the resin is again pulsed so as to be moved for reuse. The amines are regenerated with only the single type resin (preferably Type I) and with significantly reduced quantity of reagents.

14 Claims, 1 Drawing Sheet

EXTRACTION OF THERMALLY STABLE CONTAMINANTS FROM STACK GAS SCRUBBING AMINES

TECHNICAL FIELD

The present invention relates to the regeneration of amines used in the scrubbing of hydrogen sulfide gas from stacks of oil and gas wells and from gasoline refinery facilities, and similar other facilities, and more particularly to the extraction of thermally stable solids from these amines using continuous countercurrent ion exchange.

BACKGROUND ART

Stack gases from many facilities, such as those of enhanced oil recovery processes, refinery hydrosulferization recycle, Claus sulfur recovery, etc., conventionally contain significant amounts of $H_2S$ and $CO_2$. These impurities act as very weakly ionized acids. It is conventional practice to use certain high boiling-point amines, which act as a mild alkali, to scrub these materials from the stack gases. Typically the amine is an alkanolamine such as ethanolamine, diethanolamine, methyl diethanolamine, diisopropanol amine and triethanol amine. In this scrubbing of the gases, the amines remove the $H_2S$ and $CO_2$. While these substances can be removed from the amines quite readily by conventional thermal recycling, other impurities are present in the amines after the scrubbing process either from the stack gas or from various chemical reactions. These other impurities form stronger acids that are sorbed by the amine irreversibly, at least by thermal regeneration. These are therefore called thermally stable anions and, in approximate decreasing order of concentration, are formate, acetate, thiocyanate, chloride, and sulfate. As referred to hereinafter, these are designated as Fo, Ac, CNS, Cl and $SO_4$.

Ion exchange methods have been found to be generally effective for removing residual anions from amine stack scrubbers. Two typical ion exchange methods are described in U.S. Pat. Nos. 4,795,565 issued to T. Y. Yan on Jan. 3, 1989, and 4,970,344 issued to A. E. Keller on Nov. 13, 1990. Both of these methods utilize fixed bed ion exchangers. However, this fixed bed practice represents heavy ion exchange loading and involve high consumption of regenerants. For example, about one volume of feed completely loads one volume of resin. This demands very frequent regeneration or very large ion exchange beds. Thiocyanate anions are especially aggravating because of their very high affinity for the ion exchange resin. As a result, both of the above-cited references disclose two different anion resins, Type I and Type II, used in combination in order to counteract the effects of different resin affinities and different regenerant consumptions. Even with the use of two types of ion exchange resins, significant quantities of sodium hydroxide and sulfuric acid are required for the removal of the heat-stable anions including thiocyanate.

It is therefore an object of the present invention to provide a process for the regeneration of amines used for stack gas scrubbing that utilizes a single type of ion exchange resin which overcomes problems of resin loading and excessive regeneration reagent consumption.

It is another object of the present invention to utilize continuous countercurrent ion exchange, in contrast to fixed bed ion exchange, to overcome problems of resin loading during the regeneration of amines used in the scrubbing of stack gases.

A further object of the present invention is to utilize continuous countercurrent ion exchange, together with a selected chemical reaction to destroy thiocyanate, to overcome problems of resin loading and thiocyanate affinity during the regeneration of amines used in the scrubbing of stack gases.

These and other objects of the present invention will become apparent upon a consideration of the following description of the continuous countercurrent ion exchange method.

DISCLOSURE OF THE INVENTION

In accordance with the present invention, there is provided a method for the regeneration of amines used for stack gas scrubbing which utilizes a single ion exchange resin in a continuous countercurrent exchanger. Either Type I or Type II anionic resin can be used, and through use of this exchanger substantially higher loading (feed/resin) ratios are obtained. Further, in a preferred embodiment of the invention thiocyanate anion is destroyed on the resin by oxidation with, for example, sodium hypochlorite. This substantially reduces the reagent consumption during regeneration.

BEST MODE FOR CARRYING OUT THE INVENTION

Figure 1:
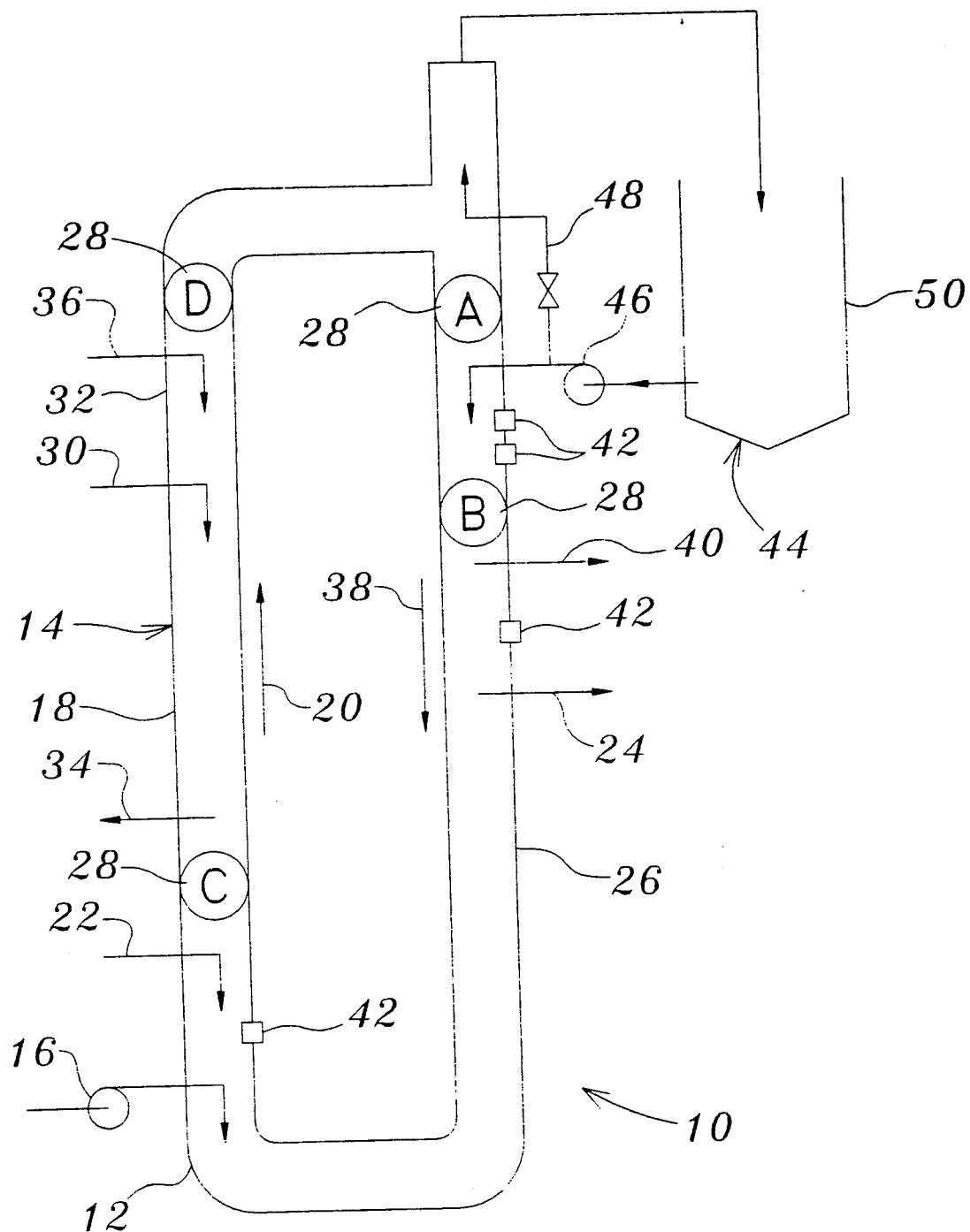
FIG. 1 is a drawing depicting a continuous countercurrent ion exchanger as used for the carrying out of the present invention.

The present invention can be best understood by reference to a continuous coutercurrent ion exchanger 10 shown in FIG. 1. This exchanger is of the type described in U.S. Pat. No. 2,815,322 issued to the present applicant, Irwin R. Higgins, on Dec. 3, 1957. Amine that is to be regenerated is fed into the exchanger 10 at a lower end 12 of a first leg 14, as with a pump 16. The amine typically has Fo, Ac, CNS, Cl and $SO_4$ as contaminants. As resin 18 in the exchanger moves upwardly in leg 14, in a direction indicated by the arrow 20, contaminants within the amine are sorbed upon the resin 18, leaving the amine substantially ready for re-use in scrubbing operations. A wash with water (typically at up to 100 degrees C) introduced at 22 carries this cleaned amine to an outlet indicated at 24 in leg 26 of the exchanger 10. The circles, indicated with the numeral 28 in the figure, represent "butterfly" valves that are conventionally utilized in this type of equipment. During the feeding of reagents these valves are closed. However, when the resin is pulsed (as discussed below), the valves B, C, and D are open and A closed to permit the movement of the resin in the column (upwardly in leg 14 and downwardly in leg 26).

In a preferred embodiment, sodium hydroxide (1–2M) enters the exchanger 10 at 30 in a generally upper portion 32 of leg 12, flowing downwardly countercurrent to the upflow of the resin 18 for the purpose of removing the constituents sorbed on the resin. The thiocyanate ion removal is enhanced through the use of a chlorine-containing addition, such as NaClO, to provide about 5–10 g/l $Cl_2$. These constituents are typically the formate, the acetate and the thiocyanate anions discussed above. A basic solution containing these anions is withdrawn at an outlet indicated at 34. Because of the benefits of using a continuous exchanger, the amount of the eluent is only ¼ to ⅓ of the amount needed in fixed bed exchangers of the prior art. Typically only about four lbs/ft³ of resin was used in tests of the equipment. Excess eluent is washed off the resin by the introduction of additional water as at 36.

The washed resin then flows downwardly in leg 26 in the direction indicated by arrow 38. Any remaining water containing products of any reaction, etc, leave the column as at 40. As stated above, the purified amine leaves the exchanger 10 at the point indicated at 24. The effectiveness of the processing is monitored at several locations in the exchanger 10 using refractory index monitoring devices as indicated at 42.

Periodically the resin is moved in the exchanger in the directions indicated by pulsing elements generally indicated at 44. This movement is as described in the aforementioned U.S. Pat. No. 2,815,322, which is incorporated herein by reference. This apparatus for the movement of resin includes a pulsing pump 46, as well as a backwash loop 48 and reservoir 50 containing water for pulsing and backwash.

The present invention was demonstrated in a two-inch I. D. continuous countercurrent ion exchanger. This contactor contained about ½ cu. ft. of a strong-base ion exchange resin. A Type I resin (e.g., Dowex SBR) was used. In general, while Type II resins can be regenerated with less caustic (NaOH) than Type I resins, they are not as thermally stable in the ROH form. (Persons skilled in the art will be knowledgeable as to these types of resins.)

The crude amine was fed into the column at typically 300 ml/min; however, this amine was heavily loaded with the contaminants from successive contacts with stack gases. The column was pulsed every three minutes, which moved the resin about four inches/min. The regeneration solution in the form of caustic was a 2M NaOH solution in sufficient amount to be an excess. Typically about four pounds of NaOH are used per cubic foot of resin. To this was added a chlorine-containing reagent, typically this is in the form of a 1% NaClO solution such as a dilute Chlorox solution. This destroyed the thiocyanate on the column, giving rise to $CO_2$, nitrogen gas and some form of sulfur, probably sulfate. Typically about 2.5 pounds of the chlorine was consumed per pound of thiocyanate.

While fully definitive tests of the present invention have not been completed, the process has been demonstrated to the extent that a considerably smaller amount of resin and reagents are needed than have been considered in the processes of the prior art. As stated above, these prior processes have required an equal quantity of resin to that of the amine being processed. In addition, due to the affinity of the contaminants and the quantities of reagents, the prior art processes have required the use of two types of resin in each of the apparatus described: a Type I anion exchanger and a Type II anion exchanger. This is in contrast to a single anion resin required in the present process.

From the foregoing, it will be understood by persons skilled in the art that a more economical and efficient process has been developed for the reactivation of spent alkanolamines used in stack scrubbing applications. While certain conditions are given for the operation of the continuous ion exchanger apparatus, these are given for illustration purposes only and not for a limitation of the present invention. Rather, the invention is to be limited only by the appended claims and their equivalents.

I claim:

1. A process for the extraction of contaminants from stack gas scrubbing amines to permit reuse of said amines, said process comprising the steps:
   introducing said amines containing said contaminants into an isolatable sorption section of a continuous countercurrent extraction column containing an anionic ion exchange resin whereby said contaminants are sorbed on said resin;
   washing said amine from said contaminants sorbed on said resin in said sorption section of said column into a discharge line of regenerated amine;
   moving at least a portion of said resin from said sorption section into an isolatable elution section of said column;
   passing a sodium hydroxide solution through said resin in said elution section for elution of said contaminants, said sodium hydroxide solution containing chlorine to enhance destruction of thiocyanate in said contaminants;
   rinsing said resin in said elution section after elution of said contaminants; and
   periodically moving a portion of rinsed resin from said elution section in a countercurrent direction relative to said sodium hydroxide solution and said water of said rinse to return said rinsed resin to said sorption section of said column.

2. The process of claim 1 wherein said sodium hydroxide solution is about 1M to about 2M NaOH.

3. The process of claim 1 wherein said chlorine is provided as NaClO, with said chlorine being present about 5 to about 10 grams per liter of the solution.

4. The process of claim 1 wherein said resin is a strong anion Type I resin.

5. The process of claim 1 wherein said rinsing of said amine from said contaminants sorbed on said resin utilizes water at a temperature of about 60 to about 100 degrees C.

6. The process of claim 1 wherein said movement of said resin is accomplished by periodically pulsing said resin in said column.

7. A process for the extraction of contaminants from stack gas scrubbing amines to permit reuse of said amines, said process comprising the steps:
   introducing said amines containing said contaminants into a isolatable sorption section of a continuous countercurrent extraction column containing an anionic ion exchange resin whereby said contaminants are sorbed on said resin;
   washing said amine from said contaminants sorbed on said resin in said sorption section of said column with hot water into a discharge line of regenerated amine;
   moving at least a portion of said resin from said sorption section into an isolatable elution section of said column;
   passing a sodium hydroxide solution through said resin in said elution section for elution of said contaminants, said sodium hydroxide solution containing chlorine as NaClO;
   rinsing said resin with water in said elution section after elution of said contaminants; and
   periodically moving a portion of rinsed resin from said elution section in a countercurrent direction relative to said sodium hydroxide solution and said water of said rinse to return said rinsed resin to said sorption section of said column.

8. The process of claim 7 wherein said sodium hydroxide solution is about 1M to about 2M NaOH.

9. The process of claim 7 wherein said chlorine is provided as NaClO, with said chlorine being present about 5 to about 10 grams per liter of the solution.

10. The process of claim 7 wherein said resin is a strong anion Type I resin.

11. The process of claim 7 wherein said rinsing of said amine from said contaminants sorbed on said resin utilizes water at a temperature of about 60 to about 100 degrees C.

12. The process of claim 7 wherein said movement of said resin is accomplished by periodically pulsing said resin in said column.

13. A process for the extraction of contaminants from stack gas scrubbing amines to permit reuse of said amines, said process comprising the steps:

introducing said amines containing said contaminants into a isolatable sorption section of a continuous countercurrent extraction column containing an anionic Type I ion exchange resin whereby said contaminants are sorbed on said resin;

washing said amine from said contaminants sorbed on said resin in said sorption section of said column with hot water at a temperature of about 60 to about 100 degrees C into a discharge line of regenerated amine;

moving at least a portion of said resin, by pulsing said resin in said column, from said sorption section into an isolatable elution section of said column;

passing a 1 to about 2M sodium hydroxide solution through said resin in said elution section for elution of said contaminants, said sodium hydroxide solution containing chlorine at a concentration of about 5 to about 10 grams per liter of solution;

rinsing said resin with water in said elution section after elution of said contaminants; and periodically moving a portion of rinsed resin, by pulsing said resin in said column, from said elution section in a countercurrent direction relative to said sodium hydroxide solution and said water of said rinse to return said rinsed resin to said sorption section of said column.

14. The process of claim 13 wherein said chlorine is provided as NaClO in said sodium hydroxide solution.

* * * * *